United States Patent
Gaither et al.

(10) Patent No.: US 7,096,320 B2
(45) Date of Patent: Aug. 22, 2006

(54) COMPUTER PERFORMANCE IMPROVEMENT BY ADJUSTING A TIME USED FOR PREEMPTIVE EVICTION OF CACHE ENTRIES

(75) Inventors: Blaine D. Gaither, Fort Collins, CO (US); Benjamin D. Osecky, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 628 days.

(21) Appl. No.: 10/004,195

(22) Filed: Oct. 31, 2001

(65) Prior Publication Data

US 2003/0084251 A1    May 1, 2003

(51) Int. Cl.
*G06F 12/00*  (2006.01)
(52) U.S. Cl. .................... 711/133; 711/159
(58) Field of Classification Search ........... 711/133, 711/159
See application file for complete search history.

(56) References Cited

U.S. PATENT DOCUMENTS

| | | | | |
|---|---|---|---|---|
| 5,655,103 A | * | 8/1997 | Cheng et al. ............ | 711/152 |
| 5,671,391 A | * | 9/1997 | Knotts .................... | 711/143 |
| 6,026,475 A | * | 2/2000 | Woodman ............... | 711/202 |
| 6,134,634 A | | 10/2000 | Marshall, Jr. et al. ..... | 711/143 |
| 6,425,057 B1 | * | 7/2002 | Cherkasova et al. ...... | 711/134 |
| 6,490,671 B1 | * | 12/2002 | Frank et al. ............. | 711/207 |
| 6,493,801 B1 | * | 12/2002 | Steely et al. ............ | 711/135 |
| 6,542,861 B1 | * | 4/2003 | Lyles et al. ............. | 703/21 |
| 6,601,143 B1 | * | 7/2003 | Lamparter ............... | 711/134 |
| 6,678,794 B1 | * | 1/2004 | Talyansky et al. ........ | 711/135 |
| 2003/0084248 A1 | * | 5/2003 | Gaither et al. ........... | 711/133 |
| 2003/0084250 A1 | * | 5/2003 | Gaither et al. ........... | 711/133 |
| 2003/0084251 A1 | * | 5/2003 | Gaither et al. ........... | 711/133 |
| 2003/0084253 A1 | * | 5/2003 | Johnson et al. .......... | 711/144 |

OTHER PUBLICATIONS

"Preemptive Eviction Of Stale Entries In A Computer Cache By Use Of Age-Bits"; Filed Oct. 31, 2001; U.S. Appl. No. 10/001,586; Applicant(s): David J.C. Johnson et al; Hewlett-Packard Company.
"Identification Of Stale Entries In a Computer Cache"; Filed Oct. 31, 2001: U.S. Appl. No. 10/001,594; Applicant(s): David J.C. Johnson et al; Hewlett-Packard Company.

\* cited by examiner

*Primary Examiner*—Reba I. Elmore
(74) *Attorney, Agent, or Firm*—Augustus W. Winfield (57) ABSTRACT

A cache memory system can determine that an entry is stale if the entry has not been accessed or modified for a predetermined time. If an entry is stale, the entry may be preemptively evicted. The predetermined time is made dynamically variable. A computer system can adjust the time to optimize a measure of performance. In a specific example, evicted lines are temporarily stored in an eviction queue. The time is adjusted to be as short as possible without substantially increasing the number of lines that must be recalled from the eviction queue.

8 Claims, 6 Drawing Sheets

COMPUTER PERFORMANCE IMPROVEMENT BY ADJUSTING A TIME USED FOR PREEMPTIVE EVICTION OF CACHE ENTRIES

FIELD OF INVENTION

This invention relates generally to computer systems and more specifically to cache memory systems.

BACKGROUND OF THE INVENTION

Most computer systems employ a multilevel hierarchy of memory systems, with relatively fast, expensive, limited-capacity memory at the highest level of the hierarchy and proceeding to relatively slower, lower cost, higher-capacity memory at the lowest level of the hierarchy. Typically, the hierarchy includes a small fast memory called a cache, either physically integrated within a processor integrated circuit, or mounted physically close to the processor for speed. There may be separate instruction caches and data caches. There may be multiple levels of caches. Many computer systems employ multiple processors, each of which may have multiple levels of caches. Some caches may be shared by multiple processors. All processors and caches may share a common main memory.

Typically, a memory is organized into words (for example, 32 bits or 64 bits per word). Typically, the minimum amount of memory that can be transferred between a cache and a next lower level of the memory hierarchy is called a line, or sometimes a block. A line is typically multiple words (for example, 16 words per line). Memory may also be divided into pages (also called segments), with many lines per page. In some systems, page size may be variable. The present patent document uses the term "line", but the invention is equally applicable to blocks or other memory organizations.

Many computer systems employ multiple processors, each of which may have multiple levels of caches. Some caches may be shared by multiple processors. All processors and caches may share a common main memory. A particular line may simultaneously exist in memory and in the cache hierarchies for multiple processors. All copies of a line in the caches must be identical, a property called coherency. The protocols for maintaining coherence for multiple processors are called cache coherence protocols.

Cache coherence protocols commonly place each cached line into one of multiple states. One common approach uses three possible states for each line in a cache. Before any lines are placed into the cache, all entries are at a default state called "Invalid". When a previously uncached physical line is placed into the cache, the state of the entry in the cache is changed from Invalid to "Shared". If a line is modified in a cache, it may also be immediately modified in memory (called write through). Alternatively, a cache may write a modified line to memory only when the modified line in the cache is invalidated or replaced (called write back). For a write-back cache, when a line in the cache is modified, or will be modified, the state of the entry in the cache is changed to "Modified". The three-state assignment just described is sometimes called a MSI protocol, referring to the first letter of each of the three states.

To improve performance, the computer system tries to keep data that will be used soon in the fastest memory, which is usually a cache high in the hierarchy. Typically, when a processor requests a line, if the line is not in a cache for the processor (cache miss), then the line is copied from main memory, or from a cache of another processor. A line from main memory, or a line from another processor's cache, is also typically copied into a cache for the requesting processor, assuming that the line will need to be accessed again soon. If a cache is full, then a new line must replace some existing line in the cache. If a line to be replaced is clean (the copy in cache is identical to the copy in main memory), it may be simply overwritten. If a line to be replaced is dirty (the copy in cache is different than the copy in main memory), then the line must be evicted (copied to main memory). A replacement algorithm is used to determine which line in the cache is replaced. A common replacement algorithm is to replace the least-recently-used line in the cache.

One particular performance concern for large multiple processor systems is the impact on latency when one processor requests a line that is cached by another processor. If a modified (dirty) line is cached by a first processor, and the line is requested by a second processor, the line is written to main memory, and is also transferred to the requesting cache (called a cache-to-cache transfer). For a large multiple-processor system, a cache-to-cache transfer may require a longer latency than a transfer from main memory. In addition, for a large multiple-processor system, a cache-to-cache transfer may generate traffic on local buses that would not be required for a transfer from main memory. Accordingly, average latency can improved by reducing the number of cache-to-cache transfers, which in turn can be improved by preemptive eviction of stale dirty lines.

In addition, for large systems, even if a line in another processor's cache is not dirty, there may be substantial latency involved in determining whether the line is actually dirty. For example, in the MSI coherency protocol, if a line is in the Modified state, one processor may modify the line without informing any other processor. A line in the Modified state in a cache may actually be clean, which means that the copy in main memory may be used, but a substantial time may be required to determine whether the line is clean or dirty. Therefore, average latency may be improved by pre-emptive eviction of stale lines in the Modified state, even if they are clean.

Systems for determining the age of dirty lines are known. For example, U.S. Pat. No. 6,134,634 describes a system in which each line in a cache has an associated counter that is used to count cycles during which the line has not been written. If the count exceeds a predetermined number, the line is determined to be stale and may be evicted.

In, U.S. application Ser. No. 10/001,586 (Published Application No. 2003/0084249, and U.S. application Ser. No. 10/001,594 (Published Application No. 2003/0084253), filed concurrently with the present application, a single age-bit may be provided for each line in a cache, or for each index. Each time a line, or index, is accessed, or written, the corresponding age-bit is set to a first logical state. A state machine periodically checks the status of each age-bit. If an age-bit is in the first logical state, the state machine sets the age-bit to a second logical state. If the age-bit is already in the second logical state, then the line of data corresponding to the age-bit, or at least one line in the set of lines corresponding to the index corresponding to the age-bit, has not been accessed or changed since the last time the stare machine checked the age-bit, and may be preemptively evicted.

Preemptive eviction of stale lines may or may not improve performance, depending on the nature of the software. For each software application of interest, given any method for identifying stale lines, there is a need for verification of performance improvement resulting from preemptive eviction, and for optimization of performance.

SUMMARY OF THE INVENTION

In an example embodiment of the invention, the time used to determine when a line is stale is made dynamically variable. A computer system can adjust the time to optimize a measure of performance. In a first example, the performance measure is the rate of cache-to-cache transfers. In a second example, the performance measure is the rate at which evicted lines are reclaimed from an eviction queue.

DETAILED DESCRIPTION OF THE PREFERRED EMBODIMENT OF THE INVENTION

The following discussion provides one example of a cache memory system that includes timing to detect stale lines. The particular example is based on U.S. application Ser. No. 10/001,586 (Published Application No. 2003/0084249, and U.S. application Ser. No. 10/001,594 (Published Application No. 2003/0084253), and is used for illustration only. However, the invention is applicable to any cache memory system that includes detection of stale lines based on time measurement.

If a cache stores an entire line address along with the data, and any line can be placed anywhere in the cache, the cache is said to be fully associative. However, for a large cache in which any line can be placed anywhere, the hardware required to rapidly determine if an entry is in the cache (and where) may be very large and expensive. For large caches, a faster, space saving alternative is to use a subset of an address (called an index) to designate a set of lines within the cache, and then store the remaining set of more significant bits of each physical address (called a tag) along with the data. In a cache with indexing, an item with a particular address can be placed only within a set of lines designated by the index. If the cache is arranged so that the index for a given address maps to exactly one line in the subset, the cache is said to be direct mapped. If the index maps to more than one line in the subset, the cache is said to be set-associative. All or part of an address is hashed to provide a set index which partitions the address space into sets.

In many computer memory architectures, a processor produces virtual addresses that are translated by a combination of hardware and software to physical addresses, which access physical main memory. A consecutive group of virtual addresses may be dynamically assigned to each page. Virtual memory (paging or segmentation) requires a data structure, sometimes called a page table, that translates the virtual address to the physical address. To reduce address translation time, computers commonly use a specialized associative cache dedicated to address translation, commonly called a Translation Look-aside Buffer (TLB).

Figure 1:
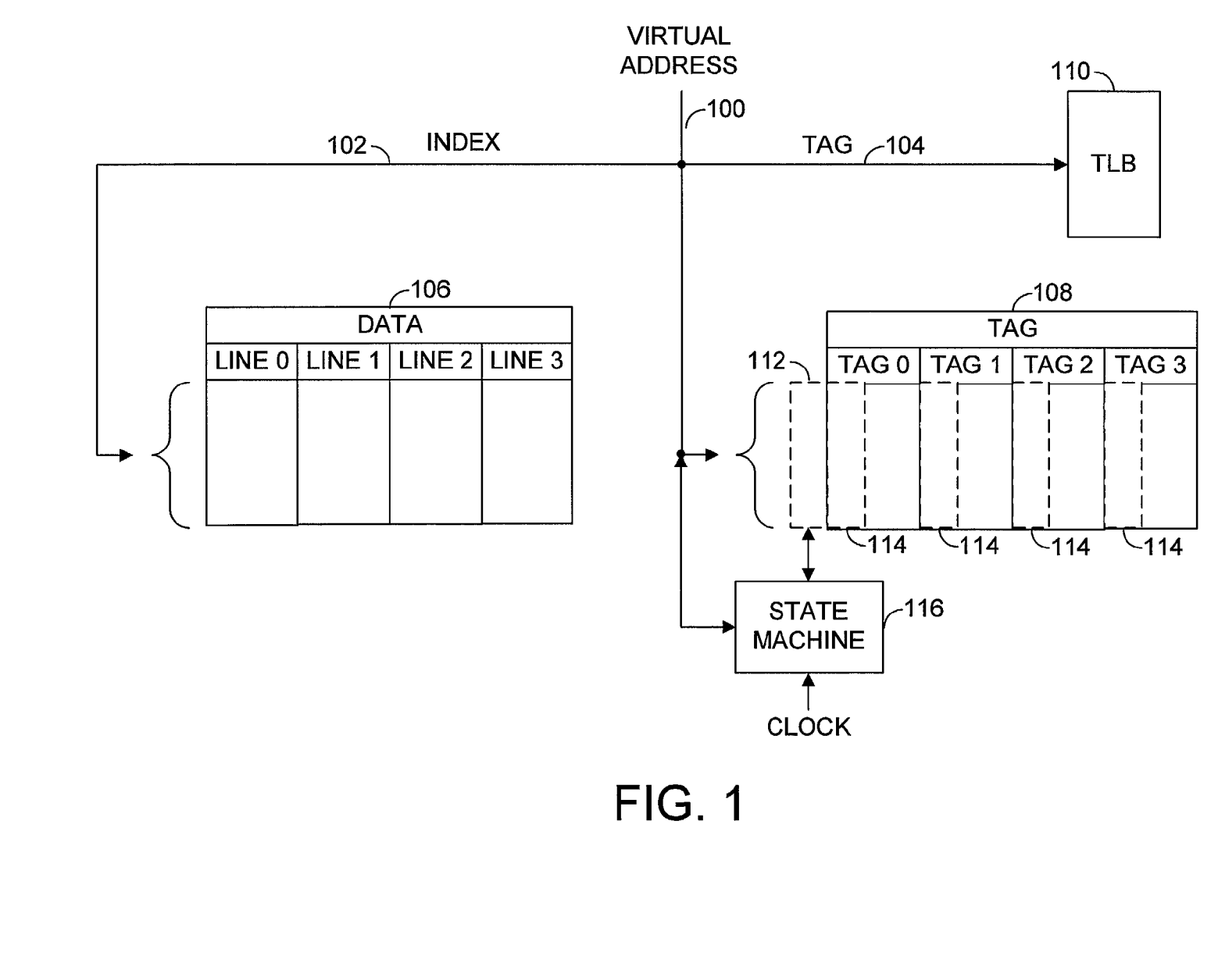
FIG. 1 is a block diagram of an example cache memory system that includes detection of stale lines.

FIG. 1 illustrates one example of a system in which timing may be used to detect stale cache entries. The specific example cache illustrated in FIG. 1 is a four-way set-associative cache with virtual addressing. However, the invention is applicable to any cache configuration, including direct mapped caches, fully associative caches, or other configurations of set associative caches. In the example of FIG. 1, a virtual address 100 comprises lower order index bits 102 and upper order tag bits 104. The index bits are typically the same for the virtual address and the physical address. The index bits are used to select one set of lines of data in the data section 106 of the cache. The output of data section 106 is four lines of data. The index bits are also used to select a set of physical tags in a tag section 108 of the cache. The output of the tag section 108 is four physical tags, each corresponding to one data line. The TLB 110 stores both virtual and physical tags. For a TLB hit, the TLB provides a physical tag that corresponds to the virtual tag 104. Each of four digital comparators (not illustrated) then compares the physical tag from the TLB to a physical tag from the tag section 108. A matching pair of physical tags indicates through logic (not illustrated) which one of four lines of data is selected by a multiplexer (not illustrated). Note that for the particular index bits there may not be a matching pair of physical tags, in which case there is a cache miss.

In the example of FIG. 1, age-bits are used to indicate whether lines in the cache may be stale. An age-bit is associated with each possible index value, or alternatively with each line in the cache. In FIG. 1, box 112 indicates a set of age-bits, with each age-bit associated with one index value. Boxes 114 indicate an alternative design, with four sets of age-bits, with each age-bit associated with one line of data. For a fully associative cache, each age-bit would be associated with one line of data. In a direct mapped cache, each age-bit would be associated with both one index value and with one line of data. It is not necessary for the age-bits to be physically located in the tag section 108 of the cache. It is only necessary to have a one-to-one relationship with index values, or alternatively with data lines. It is common to store cache coherency information in the tag section 108, so that age-bits can be added to the tag section with little incremental hardware. In addition, for some processor architectures, the tag section 108 may be integrated onto the processor chip, and the data structure 106 may be on a separate chip. If the tag structure 108 is an integral part of the processor, access times for age-bits is decreased, facilitating manipulation of age-bits during the latency for data retrieval.

Figure 3:
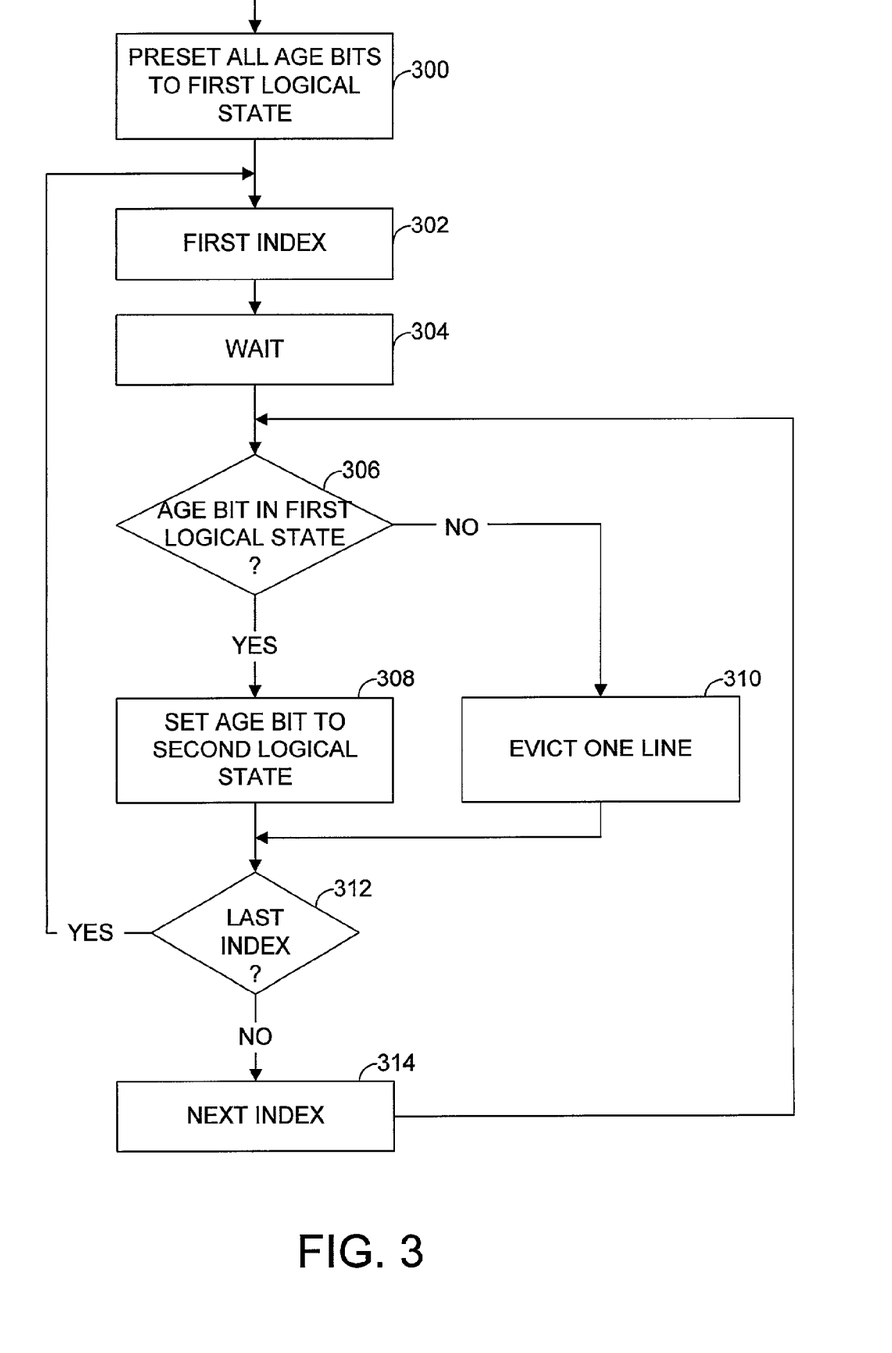
FIG. 3 is a flow chart of a method for the state machine of the system of FIG. 1.

A state machine 116 periodically cycles through all the age-bits, as discussed in more detail in conjunction with FIG. 3. For purposes of illustration only, in FIG. 1, the state machine 116 is shown as interacting with age-bits 112 associated with each index value. If the age-bits are associated with every line of the data (age-bits 114), then the state machine would interact with age-bits 114.

Figure 2A:
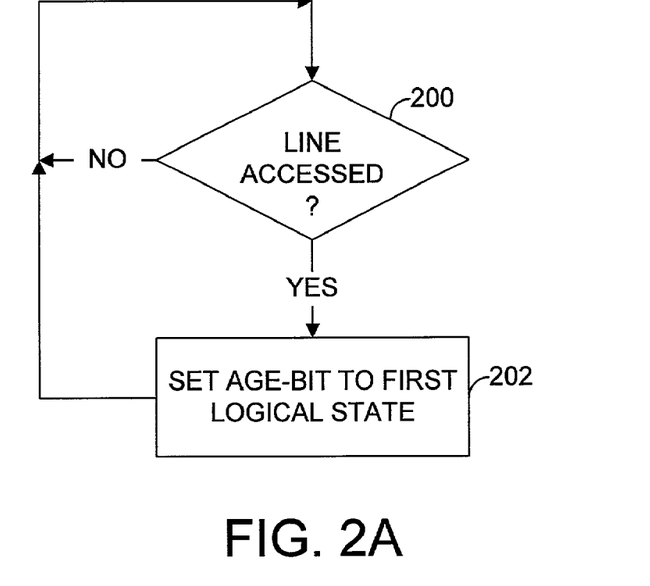
FIGS. 2A and 2B are flow charts of event-driven methods for the system of FIG. 1.
Figure 2B:
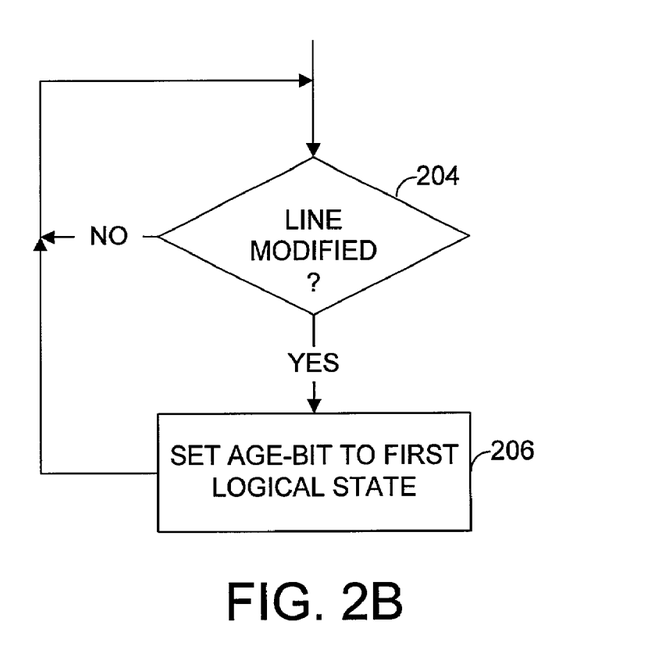

FIGS. 2A and 2B illustrate example alternative event driven methods, and FIG. 3 illustrates an example method for the state machine (FIG. 1, 116). All the age-bits may initially be preset to a first logical state (for example, logical ZERO) (FIG. 3, 300). The age-bits may then be used to detect whether a line has been accessed (read or write) (FIG. 2A), or alternatively whether a line has been modified (write only) (FIG. 2B). If the goal is to identify stale lines, then each time a line is accessed (FIG. 2A, 200), the corresponding age-bit is set to the first logical state (FIG. 2A, 202). Alternatively, if the goal is to identify stale dirty lines, each time a line is modified (written) (FIG. 2B, 204), the corresponding age-bit is set to the first logical state (FIG. 2B, 206). If the age-bits are physically part of the cache, they may be set to the first logical state by the cache. If the age-bits are physically separate from the cache, the state machine (FIG. 1, 116) may receive the index value and the state machine may set the corresponding age-bit to the first logical state.

FIG. 3 illustrates an example method for the state machine (FIG. 1, 116), assuming that there is one age-bit for each index value (FIG. 1, 112). At step 300, each age-bit is initialized to a first logical state, for example, logical ZERO. The index is initialized at step 302. The state machine then waits for a predetermined amount of time (step 304) before checking the status of the age-bits. The state machine then cycles repeatedly through all index values. At step 306, for each index value, the state machine examines the state of the corresponding age-bit. If the age-bit is in the first logical state, then at step 308, the state machine sets the age-bit to a second logical state (for example, logical ONE).

If the age-bit is already in the second logical state, at step 310, one line in the set of lines corresponding to the index value may be evicted. In a set associative cache, there are multiple lines that correspond to the index value, and the system must determine which of the multiple lines to evict. There may be more than one stale line corresponding to the index value. It is common for caches to have a replacement algorithm, for example, least-recently-used. For the example of a four-way set-associative cache, the replacement algorithm may be used to select one of four lines associated with an index value having a corresponding age-bit in the second logical state. There are several alternatives. If the goal is to detect and evict stale lines, then the replacement algorithm may be used to select any of the lines corresponding to the index value. In particular, if the replacement algorithm is least-recently-used, a stale line will be evicted. If the goal is to detect stale dirty lines, then the replacement algorithm may be limited to just the modified lines corresponding to the index value.

Steps 312 and 314 cycle steps 306–310 through all the index values, and then execute the wait period (step 304) before repeating the cycle.

In the example embodiment of FIG. 3, the wait time 304 is a minimum wait time, and the overall cycle time for checking status for any particular age-bit may be longer than the minimum wait time by a variable amount. For example, it may be preferable to execute the index loop (FIG. 3, steps 306–314) only when the cache is otherwise idle, so the total cycle time for checking the status for any one age-bit may depend on how busy the cache is. In addition, recall that each time a line is accessed (or alternatively, each time a line is written), the corresponding age-bit is set to the first logical state. As a result, setting age-bits to the first logical state (FIGS. 2A and 2B) is asynchronous to the method of FIG. 3. Accordingly, the time between when an age-bit is set to the first logical state, and the time at which it is checked by the state machine, is variable. As an alternative, setting age-bits to the first logical state could be made synchronous, for example by delaying setting age-bits until just before or after step 304 of FIG. 3, and the state machine could be implemented with non-variable cycle times.

If there is one age-bit per line (FIG. 1, 114), for the example of a four-way set-associative cache, then the system using the example method of FIG. 3 could repeat steps 306 through 310 four times, once for each of four age-bits associated with each index value. For a fully associative cache, the system could cycle through the entries in a look-up structure (for example, a content-addressable-memory) instead of index values.

In the resulting cache system, stale lines, or alternatively stale dirty lines, can be identified by adding only one bit for each of the number of index values in the cache, or one bit for each of the number of lines in the cache, plus a state machine.

Given a method for determining the age of a dirty line in a cache, an optimal time for evicting the line is just after the last use of the line. If the eviction time is set too long, then there is an increased probability that another cache will request the line, resulting in a cache-to-cache transfer. If the eviction time is set too short, then there is an increased probability that the evicting cache will have to re-read, from main memory, a line that was just evicted. Either of the just identified problems may be used as a performance measure. That is, a first example of a performance measure is to measure the rate of cache-to-cache transfers. A second example of a performance measure is to measure the rate of reuse, the number of lines that are evicted from a cache but that are soon needed again by a processor. A single performance measure, or multiple performance measures, may be used. If only the rate of reuse is used, the operating system may start with a long time variable, and then reduce the time variable until the rate of reuse of evicted lines starts to increase. If only the rate of cache-to-cache transfers is used, the operating system may start with a short time variable, and then increase the variable until the rate of cache-to-cache transfers starts to increase. If both performance measures are used, there may be a range where the time variable does not cause excessive reuse or excessive cache-to-cache transfers. Alternatively, if both performance measures result in a continuous change of performance, the time variable may be set to a time corresponding to the intersection of two curves: (a) reuse rate versus time variable, and (b) cache-to-cache transfer rate versus time variable.

Figure 4:
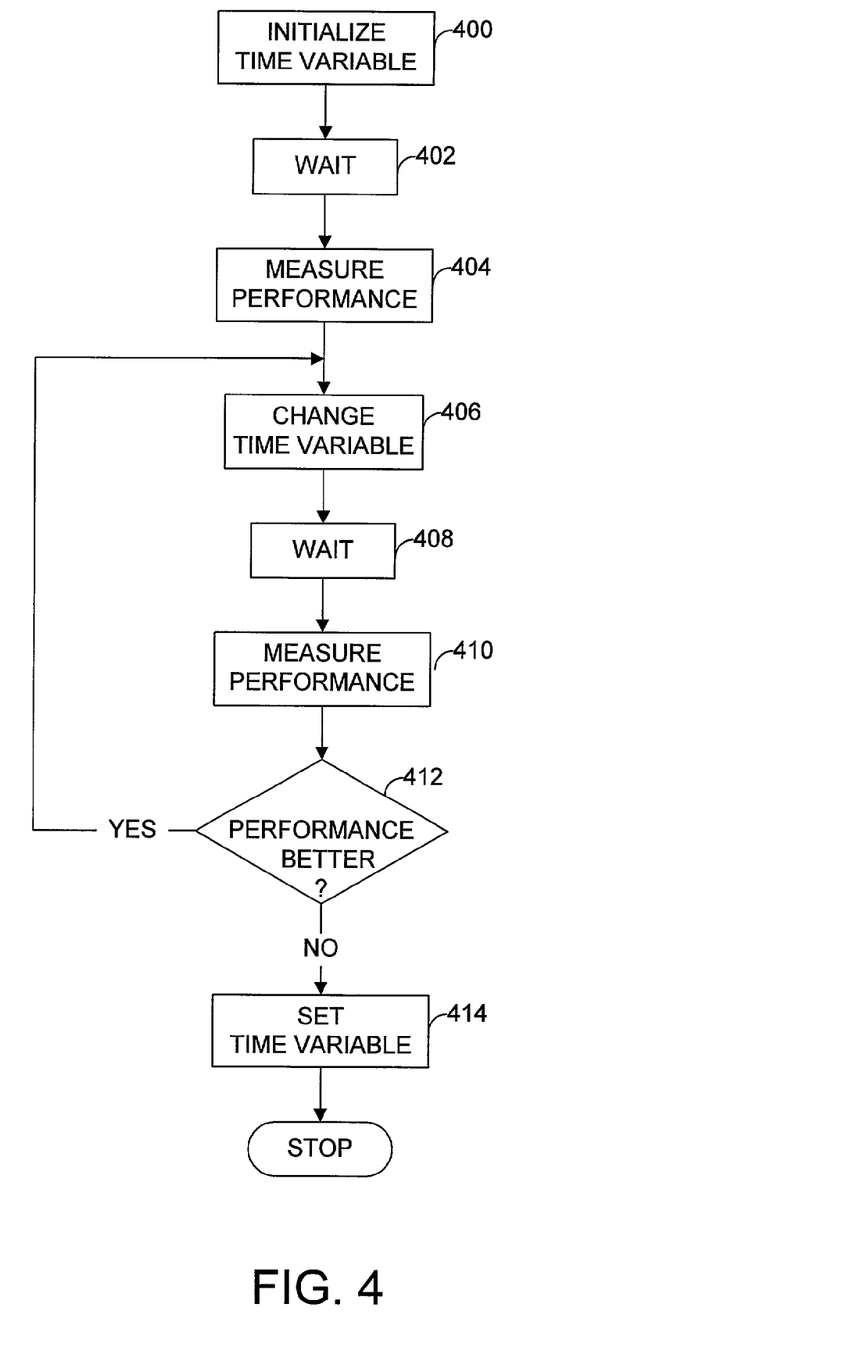
FIG. 4 is a flow chart of an example method for optimizing performance in accordance with the invention.

FIG. 4 illustrates one example method to optimize performance, given a particular software application or set of software applications, and a cache memory that can detect stale lines based on timing. Other performance measures and optimization techniques may be used. In FIG. 4, at step 400, a time variable is initialized. After a wait period 402, an initial performance measure is determined at step 404. At step 406, the time variable is changed. After a wait period 408, the performance parameter is measured at step 410. The system waits at steps 402 and 408 to let the computer system operate for a while using a particular value of the time variable. The time variable of steps 400 and 406 is a time variable used to identify stale lines. An example of the time variable is wait time 304 in FIG. 3. At step 412, if the measured performance parameter is better than the previous measurement (or initial value), then the time variable is changed (step 406) and the process is repeated. If at step 412 the performance is worse than the previous measurement, then at step 414 the time variable to set at the value that optimizes performance, for example the value used for the previous performance measurement. As discussed further below, preferably, the initial value of the time variable (step 400) is one that ensures that performance will initially improve as determined at step 412. The steps may be repeated so that average values can be used to reduce noise. Alternatively, performance versus the value of the time variable may be analyzed as a function and an optimal value of the time variable may be derived from the function.

Figure 5:
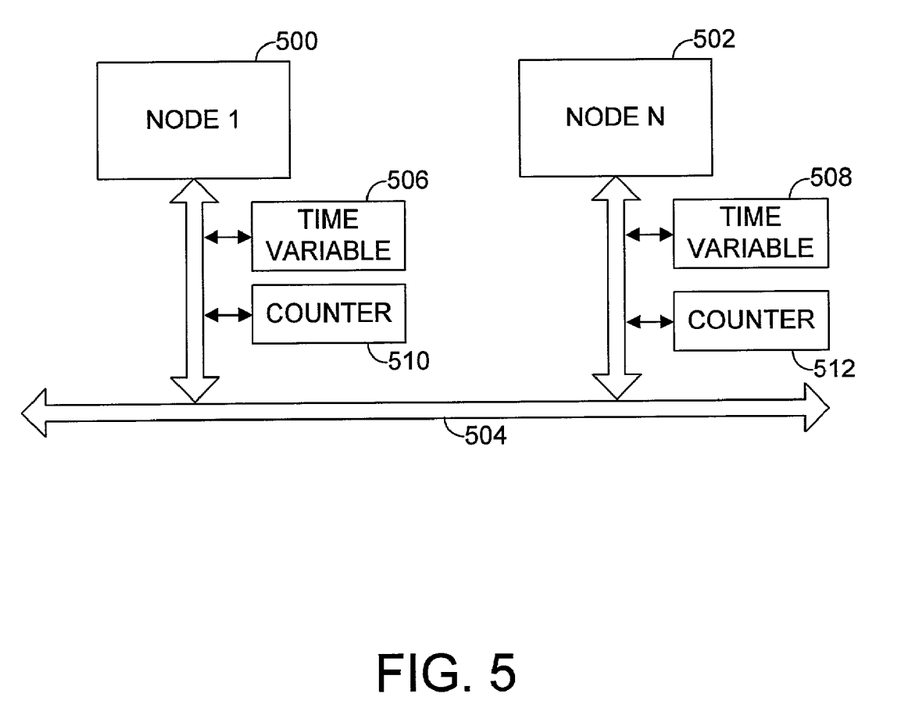
FIG. 5 is a block diagram of an example cache memory system that includes an example embodiment for implementing a first performance measure in accordance with the invention.

FIG. 5 illustrates an example computer system that includes timing to detect stale lines, with adjustment of the timing to optimize performance, using cache-to-cache transfer rate for a performance measurement. In FIG. 5, two of N nodes (500 and 502) are interconnected by a bus (or switch, or fabric) 504. Each node may contain multiple processors, multiple cache memories, and main memory. It is known for multiprocessor systems to provide a signal that indicates that a request for data for one processor is being serviced from a cache for another processor (a cache-to-cache transfer). That is, the transferring processor asserts the signal to indicate that it is providing the requested data from its cache, and that main memory should not respond. In one commercially available processor architecture, the signal is called "HITM#". The following discussion assumes that the system in FIG. 5 includes a signal that indicates a cache-to-cache transfer. The system in FIG. 5 measures the rate of cache-to-cache transfers for each node. In particular, a counter 510 counts each occurrence of the signal indicating a cache-to-cache transfer, in response to a request from node 500, over a predetermined time period, to determine a rate of cache-to-cache transfers to node 500. Each node includes a system that includes timing to determine when lines are stale for preemptive eviction, which in turn uses a time variable expressly illustrated in FIG. 5 by time variables 506 and 508. These time variables are illustrated separately to facilitate discussion, and may simply be a value in a register in a processor in the corresponding node, or a value stored as part of a cache, for use in timing to detect stale lines. For example, the time variables 506 and 508 may correspond to the wait time 304 in FIG. 3. As illustrated in FIG. 4, a processor in a node in FIG. 5 monitors the rate of cache-to-cache transfers as a performance measure, and adjusts the time variable (506 or 508) to a time that is less than a value that causes an increase in the rate of cache-to-cache transfers. As one example, the time variable may start as a small value, and then may be increased until the rate of cache-to-cache transfers starts to increase. The value actually used will preferably be less than the value that causes cache-to-cache transfers to increase.

A system as in FIG. 5 may optionally add a bit for each cache entry to indicate whether the entry has resulted from a cache-to-cache transfer. Then, the timing variable may be used to indicate when a dirty line resulting from a cache-to-cache transfer needs to be preemptively evicted.

Figure 6:
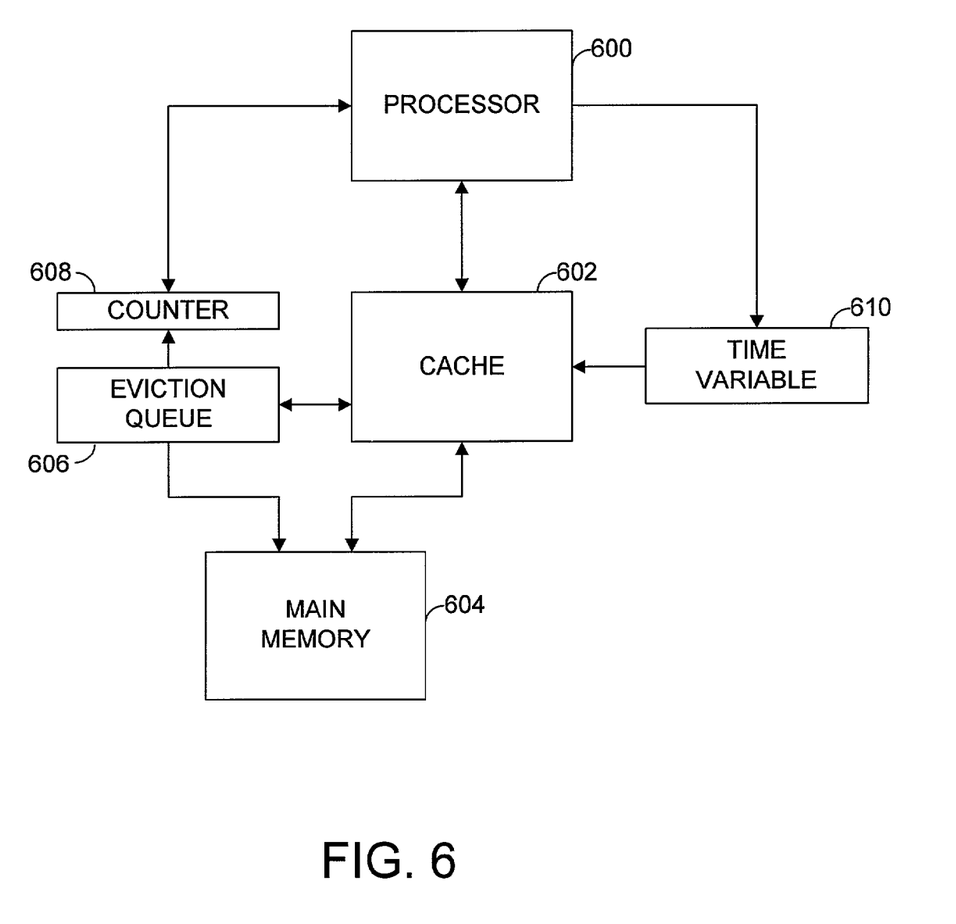
FIG. 6 is a block diagram of an example cache memory system that includes an example embodiment for implementing a second performance measure in accordance with the invention.

FIG. 6 illustrates an example computer system that includes timing to detect stale dirty lines, with adjustment of the timing to optimize performance, using reuse rate for a performance measurement. In FIG. 6, a processor 600 has an associated cache memory 602 and main memory 604. When lines are evicted from the cache 602, they are first placed into an eviction queue 606. Lines in the eviction queue 606 are then written to the main memory 604 after some delay time, depending on bus activity. If a line in the eviction queue 606 is requested by processor 600, it may be read directly from the eviction queue, or it may be written back to the cache 602, or both. The system in FIG. 6 also includes a counter 608 that counts the number of times lines are read out of the eviction queue 606, over a predetermined time period. The counter 608 may be reset by the processor 600, and the value of the counter may be read by the processor 600. FIG. 6 also illustrates a time variable 610. This time variable 610 is illustrated separately to facilitate discussion, and may simply be a value in a register in the processor 600 or a value stored as part of the cache 602 for use in timing to detect stale lines.

Assume for illustration that cache 602 in FIG. 6 is a cache as in FIG. 1 implementing processes as illustrated in FIGS. 2A, 2B and 3. The time variable 610 then corresponds to the wait time 604 in FIG. 3. In addition, time variable 610 is controllable by the processor 600 as in steps 400, 408, and 410 in FIG. 4. In the system of FIG. 6, the performance measure is the value of the counter 608. Applying the method of FIG. 4 to the system of FIG. 6, the time variable 610 may be initialized to a high value. At a high value, the lines that are evicted are very stale, and there is low probability of reuse after eviction. Accordingly, the count in counter 608 should be relatively low. The value of the time variable 610 is then reduced. If the time variable 610 is reduced without resulting in an increase in the count in counter 608, then the probability of cache-to-cache transfers is being decreased without causing eviction of lines that need to be reused. Eventually, the value of the time variable 610 will be reduced to a value at which the value of the counter 608 starts to increase. At that point, performance may decrease because lines are being prematurely evicted from the cache. At that point, the time variable may be set to a slightly higher value, and then remain constant. Alternatively, one or more performance measures versus the value of the time variable may be analyzed as functions, and an optimal value of the time variable may be derived from the functions. Alternatively, the optimum setting of the time variable may be periodically re-evaluated.

As discussed above, a system in accordance with the invention can improve performance by adjusting a time used for determining when cache entries are stale.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of improving performance of a computer system, comprising:
   (a) specifying a time period;
   (b) evicting, from a cache memory, at least one entry that has remained unchanged for at least the time period;
   (c) measuring at least one performance parameter;
   (d) changing the value of the time period;
   (e) repeating steps (b) and (c); and
   (f) determining whether the performance parameter has changed.

2. The method of claim 1, step (c) further comprising:
   measuring the rate of cache-to-cache transfers.

3. The method of claim 1, step (c) further comprising:
   measuring how many evicted entries are accessed during a predetermined time span.

4. The method of claim 1, step (b) further comprising:
   evicting, from a cache memory, at least one modified entry that has remained unchanged for at least the time period.

5. The method of claim 1, step (b) further comprising:
    evicting, from a cache memory, at least one entry that was received in a cache-to-cache transfer and has remained unchanged for at least the time period.
6. The method of claim 1, step (b) further comprising:
    evicting, from a cache memory, at least one modified entry that was received in a cache-to-cache transfer and has remained unchanged for at least the time period.
7. The method of claim 1, further comprising:
    repeating steps (a) through (f) until the performance parameter is optimized.
8. The method of claim 1, further comprising:
    repeating steps (a) through (f) until the performance parameter changes.

* * * * *

UNITED STATES PATENT AND TRADEMARK OFFICE
CERTIFICATE OF CORRECTION

PATENT NO.       : 7,096,320 B2
APPLICATION NO.  : 10/004195
DATED            : August 22, 2006
INVENTOR(S)      : Blaine D. Gaither et al.

Page 1 of 1

It is certified that error appears in the above-identified patent and that said Letters Patent is hereby corrected as shown below:

On the Title page, in field (73), in "Assignee", in column 1, line 2, delete "LP.," and insert -- L.P., --, therefor.

In column 2, line 61, delete "stare" and insert -- state --, therefor.

Signed and Sealed this

Third Day of March, 2009

JOHN DOLL
*Acting Director of the United States Patent and Trademark Office*